(12) United States Patent
Johnson

(10) Patent No.: US 8,210,925 B2
(45) Date of Patent: Jul. 3, 2012

(54) ADJUSTING DIFFICULTY LEVEL OF A MULTIPLAYER GAME

(75) Inventor: Brett Johnson, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 453 days.

(21) Appl. No.: 12/472,077

(22) Filed: May 26, 2009

(65) Prior Publication Data

US 2010/0304839 A1    Dec. 2, 2010

(51) Int. Cl.
    *A63F 13/00*    (2006.01)
(52) U.S. Cl. ............... 463/23; 463/24; 463/25; 463/26; 463/27; 463/29
(58) Field of Classification Search .............. 463/23
    See application file for complete search history.

(56) References Cited

U.S. PATENT DOCUMENTS

| | | | |
|---|---|---|---|
| 4,915,384 A * | 4/1990 | Bear ........................... | 473/451 |
| 5,779,549 A * | 7/1998 | Walker et al. .................. | 463/42 |
| 6,206,702 B1 * | 3/2001 | Hayden et al. ................ | 434/236 |
| 6,884,167 B2 * | 4/2005 | Walker et al. .................. | 463/20 |
| 6,914,975 B2 * | 7/2005 | Koehler et al. .......... | 379/265.05 |
| 7,367,887 B2 | 5/2008 | Watabe et al. | |
| 7,694,335 B1 * | 4/2010 | Turner et al. .................... | 726/14 |
| 7,967,671 B2 * | 6/2011 | Kouno et al. .................. | 463/12 |
| 2003/0129576 A1 * | 7/2003 | Wood et al. .................. | 434/362 |
| 2004/0002369 A1 * | 1/2004 | Walker et al. ..................... | 463/1 |
| 2005/0054444 A1 * | 3/2005 | Okada ............................ | 463/42 |
| 2005/0239538 A1 * | 10/2005 | Dixon ........................... | 463/20 |
| 2007/0011005 A1 * | 1/2007 | Morrison et al. ............. | 704/231 |
| 2007/0066403 A1 * | 3/2007 | Conkwright ................... | 463/43 |
| 2007/0246888 A1 * | 10/2007 | Seal .............................. | 273/430 |
| 2008/0261680 A1 * | 10/2008 | Buecheler et al. .............. | 463/23 |
| 2008/0266250 A1 | 10/2008 | Jacob | |
| 2008/0268943 A1 * | 10/2008 | Jacob ............................. | 463/23 |
| 2008/0311980 A1 * | 12/2008 | Cannon ......................... | 463/25 |
| 2009/0036199 A1 * | 2/2009 | Myus et al. .................... | 463/23 |

OTHER PUBLICATIONS

Hunicke, et al., "AI for Dynamic Difficulty Adjustment in Games", Retrieved at <<http://cs.northwestern.edu/~hunicke/pubs/Hamlet.pdf, pp. 6, 2005.

Spronck, et al., "Difficulty Scaling of Game AI", Retrieved at <<http://www.nici.ru.nl/~idak/publications/papers/SpronckGAMEON2004.pdf>>, pp. 5.

Spronck, et al., "Adaptive Game AI with Dynamic Scripting", Retrieved at <<http://www.personeel.unimaas.nl/M-Ponsen/pubs/DynamicScripting.pdf>>, 2005, pp. 1-42.

(Continued)

*Primary Examiner* — N Drew Richards
*Assistant Examiner* — Ankush Singal
(74) *Attorney, Agent, or Firm* — Alleman Hall McCoy Russell & Tuttle LLP

(57) ABSTRACT

Systems and methods for controlling a difficulty level of a multiplayer networked game are provided herein. One exemplary method includes setting an initial difficulty level at a gaming server for a game played by a main gaming client and one or more challenger gaming clients. The method further includes sending an input request to the main gaming client and each challenger gaming client based on the initial difficulty level. The method further includes receiving main user input from the main gaming client, and challenger user input from each challenger gaming client responsive to the input request. The method also includes adjusting the initial difficulty level to an adjusted difficulty level based on the challenger user input.

20 Claims, 5 Drawing Sheets

OTHER PUBLICATIONS

Hunicke, Robin, "The Case for Dynamic Difficulty Adjustment in Games", Retrieved at <<http://delivery.acm.org/10.1145/1180000/1178573/p429-hunicke.pdf?key1=1178573&key2=7045205321&coll=GUIDE&dl=GUIDE&CFID=23259199&CFTOKEN=76612993>>, pp. 429-433.

Boulanger, Jean-Sebastien, "Interest Management for Massively Multiplayer Games", Retrieved at <<http://citeseerx.ist.psu.edu/viewdoc/download?doi=10.1.1.126.3785&rep=rep1&type=pdf>>, Aug. 2006, pp. 116.

* cited by examiner

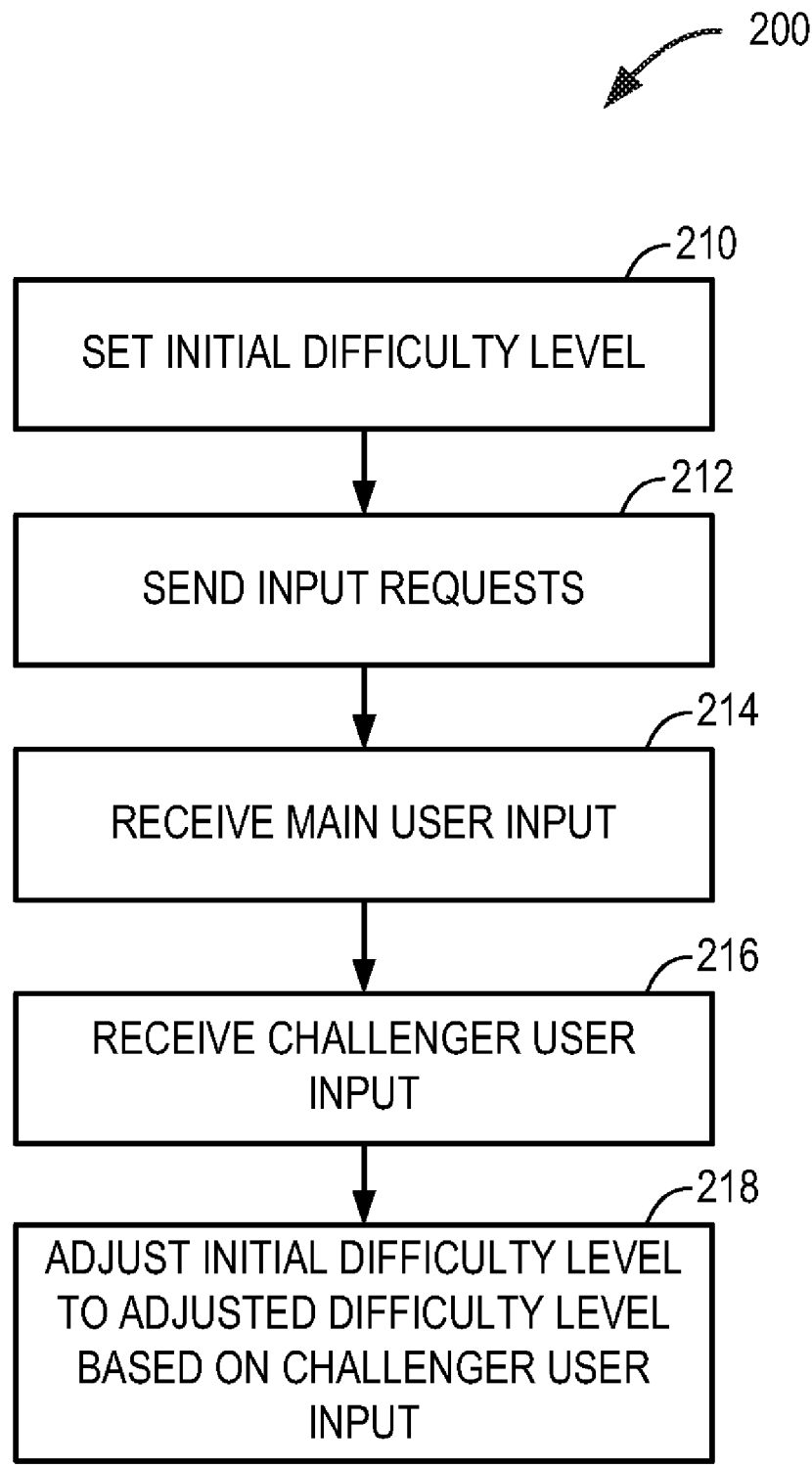

ADJUSTING DIFFICULTY LEVEL OF A MULTIPLAYER GAME

BACKGROUND

Virtual games may provide for different difficulty levels depending upon a player's level of skill. For example, a video game may increase in difficulty for a player as a player progressively achieves goals in the game. Further, multiplayer games, such as games played over a computer network, may allow for players of different skill levels to play at different difficulty levels in a single game. However, in such games, changes in a difficulty level for a player generally occur based upon the actions of that player, rather than other players in the game.

SUMMARY

Accordingly, various embodiments related to the adjustment of a difficulty level of a multiplayer networked game are provided herein. For example, one embodiment comprises setting an initial difficulty level at a gaming server for a game played by a main gaming client and one or more challenger gaming clients, and then sending an input request to the main gaming client and each challenger gaming client based on the initial difficulty level. The method further includes receiving main user input from the main gaming client and challenger user input from each challenger gaming client responsive to the input request, and then adjusting the initial difficulty level to an adjusted difficulty level based on the challenger user input.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 is a flowchart illustrating an embodiment of a method for controlling a difficulty level of a multiplayer game.

DETAILED DESCRIPTION

Various embodiments related to controlling a difficulty level of a multiplayer game are described herein in which a difficulty level for one player is controlled by actions of one or more other players. The multiplayer game may be any game (e.g., trivia, battle, etc.) played by a plurality of players, including but not limited to networked games. For example, various embodiments of multiplayer games disclosed herein include a main player playing via a main gaming client and one or more challenger players playing via one or more challenger gaming clients. In some examples, such a game may also be played by additional crowd players via one or more crowd gaming clients, as explained in more detail below. It may be appreciated that a main player, challenger player, and/or crowd player may be an automated or modeled player (e.g. a "computer player") executable via one or more computing devices or servers. Further, it will be appreciated that the concepts disclosed herein may be used in any other suitable multiplayer game environment than the embodiments specifically described herein.

An example of a game played by a main player, a plurality of challenger players, and a plurality of crowd players will be described in the context of a question-and-answer game (e.g. a trivia game) with respect to the figures herein. In some embodiments, such a game may be played during a fixed-time episode, such as a two-hour episode, such that the processes described herein are carried out within a discrete period of time. It will be appreciated that the example provided is non-limiting, and the systems and methods herein can be applied to any suitable game with any number of suitable players playing against each other individually or as teams, for either a fixed or variable length of time.

Figure 1:
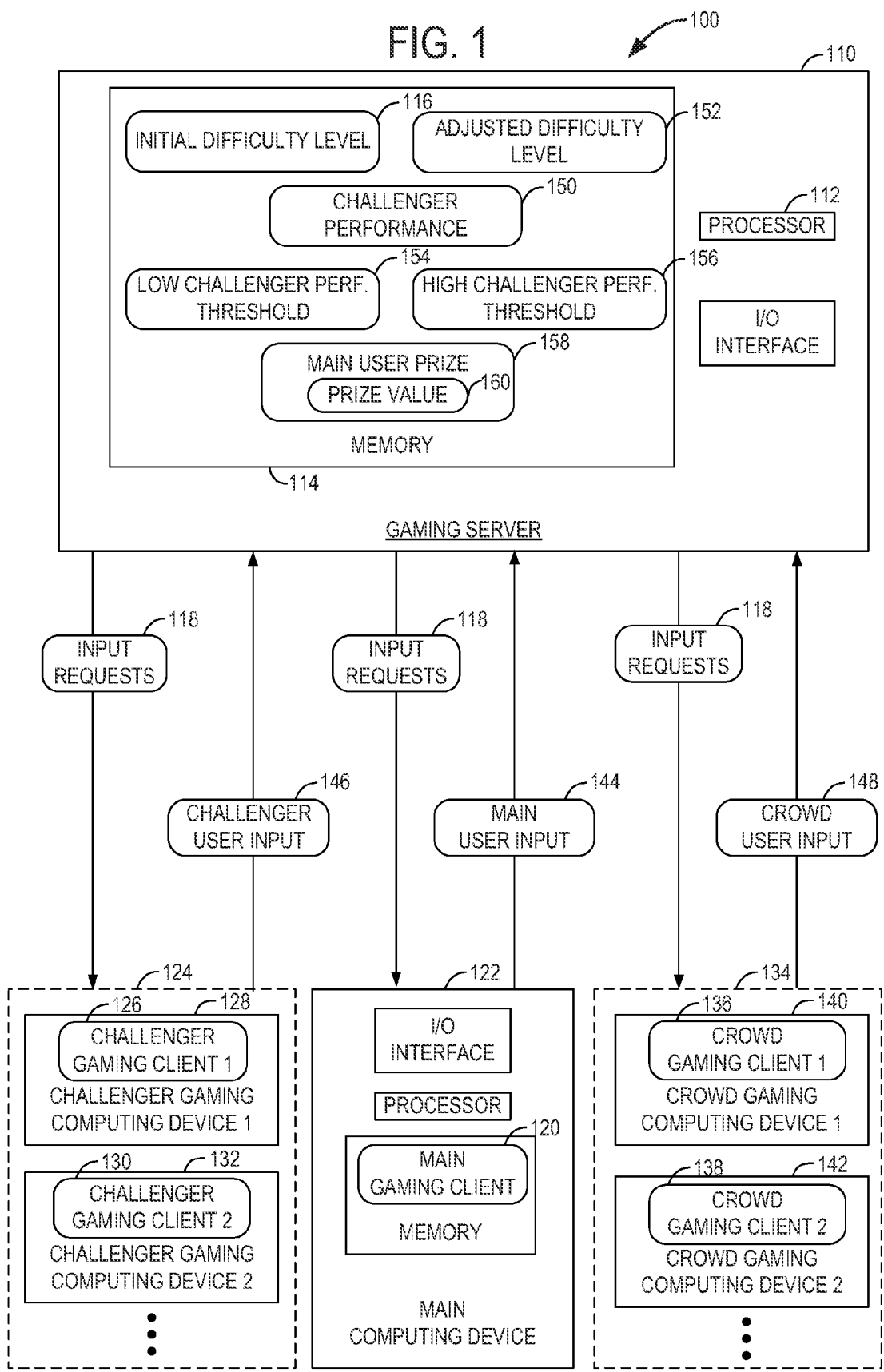
FIG. 1 is a schematic view of an embodiment of a multiplayer game system.

FIG. 1 illustrates a system 100 for controlling a difficulty level of a multiplayer networked game, including but not limited to a multi-player trivia game. The system 100 includes a gaming server 110 including a processor 112 and memory 114 having instructions executable by the processor 112 to perform various methods of playing a multi-player game, including but not limited to those methods described herein. For example, the gaming server 110 may be configured to set an initial difficulty level 116 for the game, either by default or by player input. In the specific example of a trivia game, the game may comprise a discrete number of difficulty levels, such as very easy, easy, medium, difficult, and very difficult. The gaming server 110 may send input requests 118, e.g. trivia questions or other suitable requests, based on the initial difficulty level to the main gaming client 120 operating on main computing device 122 and to one or more of a plurality of challenger gaming clients 124, such as first challenger gaming client 126 residing on first challenger computing device 128 and second challenger gaming client 130 residing on second challenger computing device 132. The gaming server 110 may also send input requests 118 to a plurality of crowd gaming clients 134, such as first crowd gaming client 136 and second crowd gaming client 138 which may respectively reside on first crowd gaming computing device 140 and second crowd gaming computing device 142 in one example. The term "main gaming client" and the like may refer herein to a client operated by a player whose game progress may be affected by the actions of other players. In some embodiments, the main player may be a player that is featured as a focus of the game, e.g. a contestant in a game show-like game, and may refer to a single player or more than one player. The term "challenger gaming client" may refer to herein as a client operated by a player that is in competition with the main player, and whose performance (or collective performance, in the case of multiple challenger players) may affect progress of the main player's game. For example, the performance of one or more challenger players may affect a prize awarded to the main player, a difficulty level of questions presented to the main player, etc. Likewise, the term "crowd gaming client" as used herein may refer to players other than the main player and challenger players who can watch the game, and who also may be allowed to answer questions presented in the game (or otherwise participate in a game, depending upon the nature of the game), but whose performance does not affect the progress of the main player's game.

Responsive to sending the input requests 118, the gaming server 110 may receive main user input 144 from main gaming client 120, challenger user input 146 from each challenger gaming client, and crowd user input 148 from each crowd gaming client. Each of main user input 144, challenger user input 146, and crowd user input 148 may be a different or same answer to the trivia question. The answer may be selected from a plurality of answer options, or the answer may be input by user-initiated text input or the like (e.g., not selected from a plurality of answer options).

The gaming server 110 may then determine a challenger performance value 150 based on aggregated challenger user input. The determination of the challenger performance value 150 may include aggregating all of the challenger user input 146 from each challenger gaming client, and determining a number of incorrect challenger user inputs and a number of correct challenger inputs by comparing the challenger user inputs to a correct, or expected, answer. In various embodiments, the challenger performance value 150 may be, for example, a percentage of correct challenger user inputs, a ratio of correct challenger user inputs to incorrect challenger user inputs, an absolute number of correct or incorrect challenger user inputs, or any other suitable metric that allows a challenger performance value to be compared to a main user performance. Further, in some embodiments, a challenger performance value may comprise more than one value or other measures for evaluating a challenger's performance quality.

Based on the challenger user input 146 and/or the challenger performance value 150, the gaming server 110 may adjust the initial difficulty level 116 to an adjusted difficulty level 152. In this manner, subsequent questions that are sent to the main user (and to the challengers) are selected based upon the adjusted difficulty level 152 that was set based upon the challenger input 146. In one specific example in which there are one hundred challengers, the challenger performance value 150 may be compared to a "low challenger performance threshold" 154 of ten incorrect challenger user inputs over two consecutive trivia questions. That is, if the challenger performance value 150 indicates that a total of ten or more challenger gaming clients have each submitted an incorrect challenger user input, or answer to a trivia question, for the last two questions posed, it is determined that the challenger performance value 150 (the number of incorrect challenger user inputs) is above the low challenger performance threshold 154. In such a case, the initial difficulty level is not adjusted. On the other hand, if fewer than ten incorrect challenger user inputs are received for the last two questions posed, then it is determined that the challenger performance value 150 is below the low challenger performance threshold 154, and the initial difficulty level is adjusted to an adjusted difficulty level 152 that is more difficult than the initial difficulty level 116. Increasing a difficulty level of the game for the main player and the challenger players where it is determined that too few challenger players submitted incorrect answers may help to ensure that a game pace does not become too slow to finish in a desired time interval, and/or too slow to maintain the interest of players.

Likewise, the challenger performance value 150 also may be compared to a high challenger performance threshold 156. The high challenger performance threshold may be used to decrease a difficulty level of game play if it is determined that too many challengers have submitted incorrect answers for a question or combination of questions. For example, in one specific embodiment, a high challenger performance threshold 156 may be set at fifteen incorrect challenger user inputs. In this example, if fifteen or more challenger gaming clients supply an incorrect answer for a selected question or combination of questions (e.g. the last two questions posed), then it is determined that the challenger performance value 150 for that question or combination of questions is above the high challenger performance threshold 156. In such a case, the initial difficulty level 116 may be adjusted to an adjusted difficulty level 152 that is less difficult.

As mentioned above, in other embodiments, the low challenger performance threshold 154 and the high challenger performance threshold 156 may each indicate a ratio of incorrect challenger user inputs to a number of correct challenger user inputs. In such a case, the high challenger performance threshold 156 may be representative of a greater ratio than the low challenger performance threshold 154. It will be appreciated that these specific embodiments of threshold schemes are described for the purpose of example, and that any other suitable method and/or threshold scheme for determining the challenger gaming clients' performance and for comparing the challenger gaming clients' performance to a target performance may be used.

The gaming server 110 may further include instructions executable by the processor 112 to remove a challenger gaming client 126 from the game when an incorrect challenger user input is received from that challenger gaming client 126. In this manner, each challenger from which an incorrect answer is received is dropped, or "knocked out", from the game upon submitting a single incorrect answer. In another example, a challenger gaming client 126 may be removed from the game when a predetermined number of incorrect inputs, or a ratio of incorrect inputs to correct inputs, are received in response to a plurality of input requests 118 sent to the first challenger gaming client 126. In this manner, a challenger is not necessarily removed for submitting a single incorrect answer, but instead may be retained in the game until two, or more, incorrect answers are submitted. Upon being removed from the game, in some embodiments, a challenger gaming client may be removed from the group of challenger gaming clients 124, or "demoted", and be placed in the group of crowd gaming clients 134.

In some embodiments, a main user prize 158 and/or one or more challenger user prizes may be provided by the gaming server. The main user prize value 160 may be adjusted based on the challenger performance. Likewise, a value of the challenger user prize may be adjusted based on the main user performance. As the challenger performance value 150 becomes worse (e.g., increases), the gaming server 110 may increase the main user prize value 160. Similarly, the main user prize value 160 may be increased as the number of challenger gaming clients removed from the game increases. That is, as the number of challenger gaming clients remaining in the game decreases, the main user prize value 160 may increase. In the same way, the challenger user prize value may be adjusted based on the main user performance, or based on the performance of the remaining challenger users.

Referring now to FIG. 2, a flowchart illustrating an embodiment of a method 200 for controlling a difficulty level of a multiplayer networked game is shown. The method 200 includes, at 210, setting an initial difficulty level at a gaming server for a game played by a main gaming client and one or more challenger gaming clients. At 212, the method 200 includes sending an input request to the main gaming client and each challenger gaming client based on the initial difficulty level. At 214, the method 200 includes receiving main user input from the main gaming client, and receiving challenger user input from each challenger gaming client at 216 responsive to the input request. Then, at 218, the method 200 includes adjusting the initial difficulty level to an adjusted difficulty level based on the challenger user input.

Figure 3A:
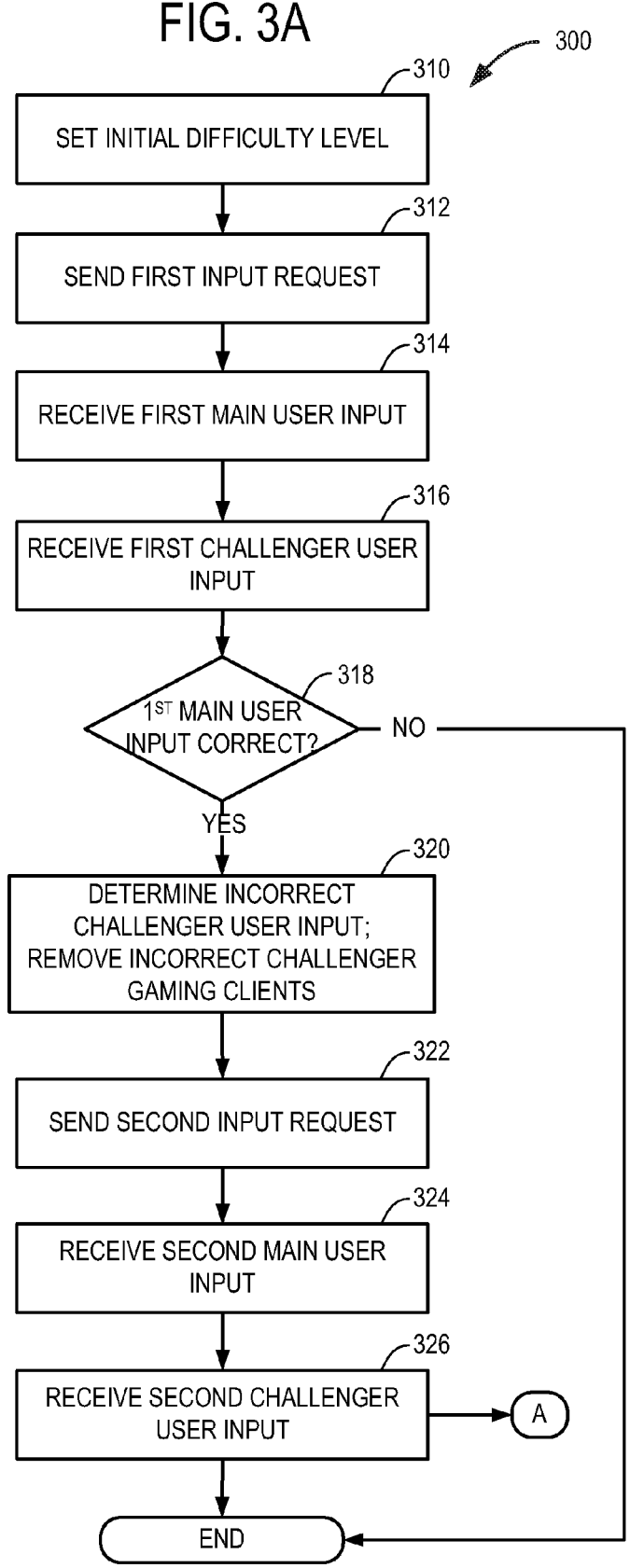
FIG. 3 is a flowchart illustrating an embodiment of another method for controlling a difficulty level of a multiplayer game.
Figure 3B:
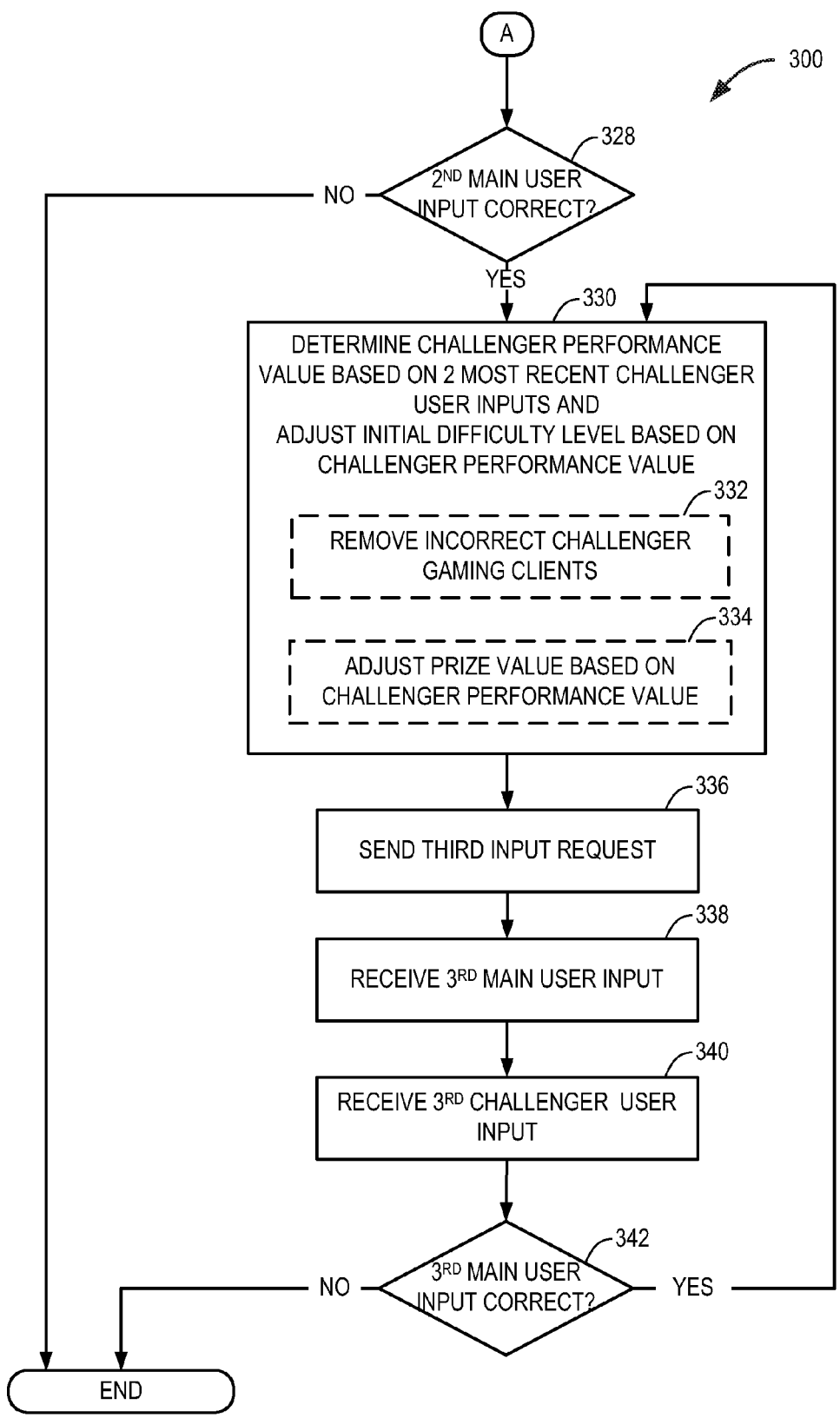

Referring now to FIG. 3A and FIG. 3B, a flowchart shows an embodiment of a more detailed method 300 for controlling a difficulty level of a multiplayer networked game. The method 300 includes setting an initial difficulty level at a gaming server for a game played by a main gaming client and one or more challenger gaming clients at 310. This initial difficulty level may be a default level, or a user-selected level. Then, at 312, the method 300 includes sending a first input request, or a first question, to the main gaming client and the challenger gaming clients. The method 300 includes receiving the first main user input at 314, and receiving the first challenger user input from the one or more challenger gaming clients at 316. Next, at 318, it is determined if the first main user input is correct. If the answer is no, method 300 may end. If the answer is yes at 318, the method 300 may include determining whether any incorrect challenger user inputs were received, and removing one or more challenger gaming clients from the game (e.g., "knocking out" the challenger gaming clients) if the one or more challenger gaming clients submit an incorrect challenger user input.

Next, the method 300 comprises sending a second question, or input request, to the main gaming client and the challenger gaming clients at 322. At 324, the second main user input is received and at 326, the second challenger user inputs are received.

At 328, it is determined if the second main user input is correct. If the answer is no, the method 300 and/or the game may end. If the answer is yes at 328, the method 300 includes determining, at 330, a challenger performance value based on the two most recent challenger user inputs (e.g., the first and/or the second challenger user inputs) received from the one or more challenger gaming clients. In another example, the challenger performance value may be calculated based on one, or more than two, recent challenger user inputs. As described above, a challenger performance value may be an absolute number of incorrect or correct challenger user inputs, a ratio of incorrect challenger user inputs to correct challenger user inputs, or any other suitable measure.

Figure 4:
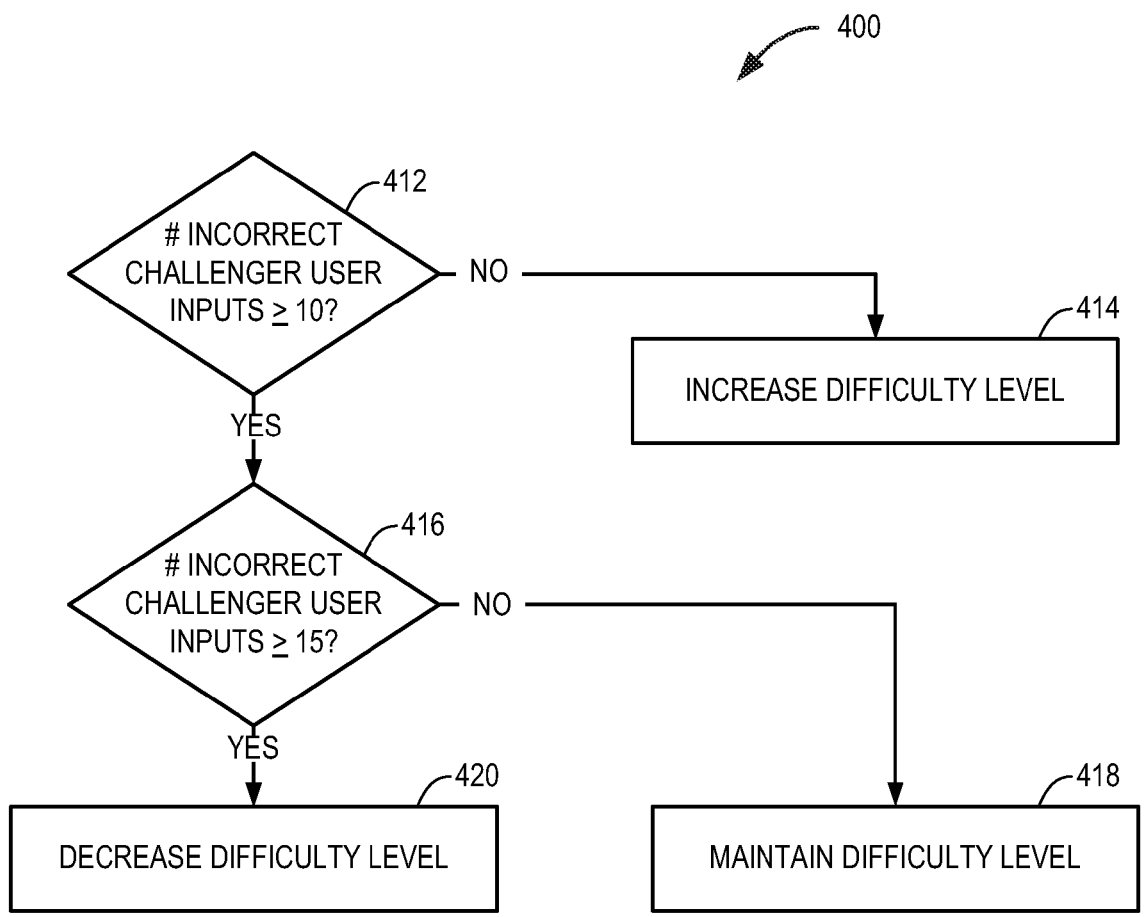
FIG. 4 is a flowchart illustrating an embodiment of a method for determining whether to change a difficulty level of a multiplayer game.

At 330, the method 300 also includes adjusting the initial difficulty level based on the challenger performance. In some examples, the initial difficulty level may not be adjusted. Process 330 may further include subprocesses, such as subprocess 332 including removing incorrect challenger gaming clients based on the challenger performance value and/or the second challenger user input (e.g., received at 328). Another subprocess 334 of step 330 may include adjusting a prize value based on challenger performance value and/or second challenger user input. Refer to FIG. 4 for a detailed example of the processes of 330.

At 336, a third input request (e.g., trivia question) may be sent from the gaming server to the main gaming client and one or more challenger gaming clients. At 338, the method 300 includes receiving a third main user input and at 340, the third challenger user input is received.

At 342, it is determined if the third main user input is correct. If the answer is no at 342, the method 300 and/or the game may end. If the answer is yes at 342, the method 300 may include then returning to step 330. Thus, in this example, challenger user input is assessed for a first time after main user input and challenger user input are received responsive to the second question, and challenger user input is assessed after each question thereafter. Therefore, it may be appreciated that "third" in steps 336, 338, 340, and 342 may be replaced with "fourth", "fifth", "sixth", etc. up to any number of questions played in the game.

Turning now to FIG. 4, a detailed example of the processes of step 330 is provided. At 412, the method 400 includes determining if a number of incorrect challenger user inputs received responsive to the two most recent consecutive input requests (e.g., the last two trivia questions) is equal to or greater than ten (e.g., is equal to or greater than a low challenger performance threshold, or a target number of incorrect challenger user inputs). That is, step 412 determines if ten or more challenger gaming clients have been "knocked out" of the game by submitting incorrect challenger user inputs responsive to one of the two most recent consecutive questions. In yet another example, in order for a challenger gaming client to be "knocked out" of the game, the challenger gaming client may have to answer incorrectly to both of the two most recent consecutive questions.

If the answer is no at 412, the method 400 may include increasing a difficulty level at 414 to an adjusted difficulty level more difficult than the initial difficulty level. In one example, the difficulty level may be changed from an initial difficulty level of "very easy" to an adjusted difficulty level of "easy". Still other examples include adjusting an initial difficulty level from "easy" to an adjusted difficulty level of "medium", from "medium" to an adjusted difficulty level of "difficult", and from "difficult" to an adjusted difficulty level of "very difficult". In other examples, the adjustment may include skipping a difficulty level, for example from an initial difficulty level of "medium" to an adjusted difficulty level of "very difficult".

If the answer is yes at 412, the method may include determining, at 416, if the number of incorrect challenger user inputs is greater than or equal to fifteen (e.g., is equal to or greater than a high challenger performance threshold, or high target number of incorrect challenger user inputs). If the answer is no at 416, the method 400 may include maintaining, or not changing, an initial difficulty level at 418.

If the answer is yes at 416, the method 400 may include decreasing the difficulty level at 420 to be less difficult than the initial difficulty level. In one example, the difficulty level may be changed from an initial difficulty level of "very difficult" to an adjusted difficulty level of "difficult". Still other examples include adjusting an initial difficulty level from "difficult" to an adjusted difficulty level of "medium", from "medium" to an adjusted difficulty level of "very easy", and from "easy" to an adjusted difficulty level of "very easy". In other examples, the adjustment may include skipping a difficulty level, for example from an initial difficulty level of "difficult" to an adjusted difficulty level of "easy".

In some examples, the method 400 may include adjusting a main user prize value based on the challenger performance. For example, the method 400 may include increasing the main user prize value the challenger performance value increases (e.g. as a number of incorrect challenger answers increases). Likewise, the method 400 may include decreasing the main user prize value as the challenger performance value decreases (e.g. as the number of incorrect challenger answers decreases). Alternately, the main user prize value may not be changed as the challenger performance value decreases. The method 400 may also include removing challenger gaming clients or demoting a challenger gaming client to become a crowd gaming client as incorrect challenger user inputs are received.

It may be appreciated that ten and fifteen are exemplary low and high challenger performance thresholds, respectively, that may be used in specific embodiments, and that any suitable value may be replaced for the low and/or high challenger performance thresholds. For example, as described above, the low challenger performance threshold and/or the high challenger performance threshold may each indicate a ratio of incorrect challenger user inputs compared to a number of correct challenger user inputs, the high challenger performance threshold being greater than the low challenger performance threshold.

Furthermore, it may be appreciated that the determination of challenger performance over the two most recent consecutive questions, as described with respect to FIG. 3A, FIG. 3B and FIG. 4, is merely exemplary. Any number of user inputs may be used to determine challenger performance, to eliminate challenger users and/or a main user from the game, and/or to determine prize value. Further still, any type of historical performance data, consecutive or non-consecutive, may be used for the aforementioned purposes. That is, a difficulty level may be adjusted after any X number of questions are posed to the players, based on the performance from a previous Y number of questions in order to eliminate Z number of players from the game, where X, Y, and Z can be any suitable numbers.

It will be appreciated that the computing devices described herein may be any suitable computing device configured to execute the programs described herein. For example, the computing devices may be a mainframe computer, personal computer, laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method for controlling a difficulty level of a multiplayer networked game, the method comprising:
setting an initial difficulty level at a gaming server for a game played by a main gaming client, one or more challenger gaming clients, and one or more crowd gaming clients, the main gaming client being a client operated by a player whose game progress may be affected by the one or more challenger gaming clients, the one or more challenger gaming clients being one or more clients whose game progress may affect the main gaming client, and the one or more crowd gaming clients each being a client operated by a player whose game progress does not affect the main gaming client;
sending an input request to the main gaming client, each challenger gaming client, and each crowd gaming client based on the initial difficulty level;
receiving main user input from the main gaming client, challenger user input from each challenger gaming client, and crowd user input from each crowd gaming client responsive to the input request; and
adjusting the initial difficulty level to an adjusted difficulty level based on the challenger user input.

2. The method of claim 1, further comprising determining a challenger performance value based on the challenger user input received from the one or more challenger gaming clients.

3. The method of claim 1, further comprising changing a first challenger gaming client to a crowd gaming client when an incorrect challenger user input is received from the first challenger gaming client.

4. The method of claim 2, where the adjusted difficulty level is more difficult than the initial difficulty level when the challenger performance value is below a low challenger performance threshold, and where the adjusted difficulty level is less difficult than the initial difficulty level when the challenger performance value is above a high challenger performance threshold.

5. The method of claim 2, where adjusting the initial difficulty level includes adjusting the initial difficulty level to an adjusted difficulty level more difficult than the initial difficulty level when the challenger performance value indicates that less than ten challenger gaming clients provided incorrect challenger user input responsive to two consecutive input requests.

6. The method of claim 2, further comprising providing a main user prize and adjusting a main user prize value based on the challenger performance.

7. The method of claim 4, where the low challenger performance threshold and the high challenger performance threshold each indicate a ratio of incorrect challenger user inputs compared to a number of correct challenger user inputs, the high challenger performance threshold being greater than the low challenger performance threshold.

8. The method of claim 5, further comprising not adjusting the initial difficulty level when the challenger performance value is greater than or equal to a low challenger performance threshold and the challenger performance value is less than or equal to a high challenger performance threshold.

9. The method of claim 6, where the adjusting the main user prize value includes increasing the main user prize value as the challenger performance value increases.

10. A system for controlling a difficulty level of a multiplayer networked game playable by a plurality of players including a main player playing via a main gaming client, one or more challenger players playing via one or more challenger gaming clients, and one or more crowd players playing via one or more crowd gaming clients, the main gaming client being a client whose game progress may be affected by the one or more challenger gaming clients, the one or more challenger gaming clients being clients whose game progress may affect the main gaming client, and the one or more crowd gaming clients each being a client whose game progress does not affect the main gaming client and the one or more challenger gaming clients, the system comprising:
a gaming server including a processor and memory having instructions executable by the processor to:
set an initial difficulty level for the game,
send an input request to the main gaming client and to the one or more challenger gaming clients based on the initial difficulty level;
receive main user input from the main gaming client, challenger user input from each challenger gaming client, and crowd user input from each crowd gaming client responsive to the input request,
determine a challenger performance value based on aggregated challenger user input, and adjust the initial difficulty level to an adjusted difficulty level based on the challenger user input, the adjusted difficulty level being more difficult than the initial difficulty level when the challenger performance value is below a low challenger performance threshold.

11. The system of claim 10, where the memory has instructions executable by the processor to adjust the initial difficulty level to an adjusted difficulty level less difficult than the initial difficulty level when the challenger performance value is above a high challenger performance threshold.

12. The system of claim 10, where the memory further comprises instructions executable by the processor to provide a main user prize and to adjust a main user prize value based on the challenger performance.

13. The system of claim 10, where the memory further comprises instructions executable by the processor to maintain the initial difficulty when the challenger performance value is greater than or equal to a low challenger performance threshold and the challenger performance value is less than or equal to a high challenger performance threshold.

14. The system of claim 10, where the memory further comprises instructions executable by the processor to remove a first challenger gaming client from the game when an incorrect challenger user input is received from the first challenger gaming client.

15. The system of claim 10, where the game is also played by a plurality of crowd gaming clients, and where the memory further comprises instructions executable by the processor to change a challenger gaming client to a crowd gaming client when an incorrect challenger user input is received from the challenger gaming client.

16. The system of claim 11, where the low challenger performance threshold and the high challenger performance threshold each indicate a number of incorrect challenger user inputs compared to a number of correct challenger user inputs, the high challenger performance threshold being representative of a greater ratio than the low challenger performance threshold.

17. The system of claim 12, where the memory further comprises instructions executable by the processor to increase the main user prize value as the challenger performance value increases.

18. A method for controlling a difficulty level of a multi-player networked game, the method comprising:
setting an initial difficulty level at a gaming server for a game played by a main gaming client, one or more challenger gaming clients, and one or more crowd gaming clients, the main gaming client being a client operated by a player whose game progress may be affected by the one or more challenger gaming clients, the one or more challenger gaming clients being clients whose game progress may affect the main gaming client, and the one or more crowd gaming clients each being a client operated by a player whose game progress does not affect the main gaming client and the one or more challenger gaming clients;
sending an input request to the main gaming client, each challenger gaming client, and each crowd gaming client based on the initial difficulty level;
receiving main user input from the main gaming client, challenger user input from each challenger gaming client, and crowd user input from each crowd gaming client responsive to the input request; and
adjusting the initial difficulty level to an adjusted difficulty level based on the challenger user input, the adjusted difficulty level being less difficult than the initial difficulty level when a number of incorrect challenger user inputs is greater than a high target number of incorrect challenger user inputs, and the adjusted difficulty level being more difficult than the initial difficulty level when a number of incorrect challenger user inputs is less than a low target number of incorrect challenger user inputs.

19. The method of claim 18, further comprising not adjusting the initial difficulty level when the number of incorrect challenger user inputs is greater than or equal to the low target number of incorrect challenger user inputs and the number of incorrect challenger user inputs is less than or equal to the high target number of incorrect challenger user inputs.

20. The method of claim 19, further comprising providing a main user prize and increasing a main user prize value as a number of incorrect challenger user inputs increases.

* * * * *